United States Patent
Wen et al.

(10) Patent No.: US 12,174,042 B2
(45) Date of Patent: Dec. 24, 2024

(54) UAV AND CONTROL METHOD THEREOF

(71) Applicant: INDUSTRIAL TECHNOLOGY RESEARCH INSTITUTE, Hsinchu (TW)

(72) Inventors: Yi-Lun Wen, Taoyuan (TW); Yu-Kai Wang, Chiayi County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 435 days.

(21) Appl. No.: 17/563,919

(22) Filed: Dec. 28, 2021

(65) Prior Publication Data
US 2023/0202644 A1   Jun. 29, 2023

(51) Int. Cl.
*G01C 5/06* (2006.01)
*B64C 13/18* (2006.01)
(Continued)

(52) U.S. Cl.
CPC .............. *G01C 5/06* (2013.01); *B64C 13/18* (2013.01); *B64C 39/024* (2013.01); *G01C 5/005* (2013.01);
(Continued)

(58) Field of Classification Search
CPC .......... G01C 5/06; G01C 5/005; B64C 13/18; B64C 39/024; G05D 1/101; G05D 1/24;
(Continued)

(56) References Cited

U.S. PATENT DOCUMENTS

| | | | | |
|---|---|---|---|---|
| 9,387,927 | B2 * | 7/2016 | Rischmuller | .......... B64U 10/14 |
| 11,625,034 | B2 * | 4/2023 | Yang | ...................... B64U 10/14 |
| | | | | 701/2 |

(Continued)

FOREIGN PATENT DOCUMENTS

| | | | | |
|---|---|---|---|---|
| CN | 104567799 A | * | 4/2015 | ............... G01C 5/00 |
| CN | 104808673 A |   | 7/2015 | |

(Continued)

OTHER PUBLICATIONS

Translation of CN-104567799-A, 16 pages (Year: 2015).*
(Continued)

*Primary Examiner* — Dale W Hilgendorf
(74) *Attorney, Agent, or Firm* — Birch, Stewart, Kolasch & Birch, LLP

(57) ABSTRACT

A UAV (unmanned aerial vehicle) including a first barometer and a processing unit is provided. The first barometer provides a first air pressure value. The processing unit is coupled to the first barometer for receiving the first air pressure value from the first barometer, performing timing-synchronization on the first air pressure value provided by the first barometer and an external reference air pressure value provided by an external reference barometer to obtain a timing-synchronized first air pressure value and recalculating the timing-synchronized first air pressure value to generate a compensated air pressure value, wherein the processing unit performs data fusion calculation on the first air pressure value, the compensated air pressure value and a sensor data to obtain a target fused data and real-timely controls the altitude and the posture of the UAV according to the target fused data.

15 Claims, 6 Drawing Sheets

(51) Int. Cl.
 *B64C 39/02* (2023.01)
 *G01C 5/00* (2006.01)
 *G05D 1/00* (2024.01)
 *G05D 1/24* (2024.01)
 *G05D 1/243* (2024.01)
 *G05D 1/48* (2024.01)
 *G05D 1/617* (2024.01)
 *G05D 105/80* (2024.01)
 *G05D 111/67* (2024.01)

(52) U.S. Cl.
 CPC .............. *G05D 1/101* (2013.01); *G05D 1/24* (2024.01); *G05D 1/243* (2024.01); *G05D 1/48* (2024.01); *G05D 1/621* (2024.01); *B64U 2201/10* (2023.01); *B64U 2201/20* (2023.01); *G05D 2105/89* (2024.01); *G05D 2111/67* (2024.01)

(58) Field of Classification Search
 CPC ........ G05D 1/1243; G05D 1/48; G05D 1/621; G05D 2105/89; G05D 2111/67; B64U 2201/10; B64U 2201/20
 See application file for complete search history.

(56) References Cited

U.S. PATENT DOCUMENTS

| | | | |
|---|---|---|---|
| 2019/0094887 A1* | 3/2019 | Di | G05D 1/0094 |
| 2019/0235047 A1 | 8/2019 | Hsiao et al. | |
| 2019/0310658 A1* | 10/2019 | Zhu | B64U 50/19 |
| 2019/0362640 A1 | 11/2019 | Wu et al. | |
| 2020/0272144 A1* | 8/2020 | Yang | B64U 10/14 |
| 2021/0163133 A1* | 6/2021 | Tao | B64U 10/13 |

FOREIGN PATENT DOCUMENTS

| | | |
|---|---|---|
| CN | 104567799 B | 3/2017 |
| CN | 206671893 U | 11/2017 |
| CN | 106406349 B | 11/2019 |
| CN | 107577238 B | 12/2020 |
| CN | 107438751 B | 1/2021 |
| CN | 111459187 B | 9/2021 |
| TW | 1628113 B | 7/2018 |
| TW | 201912512 A | 4/2019 |
| TW | 201925033 A | 7/2019 |
| TW | 202113394 A | 4/2021 |
| WO | WO2020/019331 A1 | 1/2020 |

OTHER PUBLICATIONS

Ashraf et al., "A low-cost solution for unmanned aerial vehicle navigation in a global positioning system-denied environment", International Journal of Distributed Sensor Networks, vol. 14(6), 2018, 17 pps.
Chen et al., "Impact of 3D UWB Antenna Radiation Pattern on Air-to-Ground Drone Connectivity", 2018 IEEE, 5 pps.
Clark et al., "Autonomous Quadrotor Terrain-Following with a Laser Rangefinder and Gimbal System", 2017 IEEE, 3 pps.
Xia et al., "Using Multiple Barometers to Detect the Floor Location of Smart Phones with Built-in Barometric Sensors for Indoor Positioning", Sensors 2015, 15, pp. 7857-7877.
Xu et al., "Height Estimation of Ultrasonic Array Based on Integrated Navigation for UAVs", The 31th Chinese Control and Decision Conference, 2019 IEEE, pp. 287-292.
Zhao et al., "Design on Altitude Control System of Quad Rotor Based on Laser Radar", IEEE/CSAA International Conference on Aircraft Utility Systems (AUS), Oct. 10-12, 2016, pp. 105-109.
Taiwanese Office Action and Search Report for Taiwanese Application No. 110149130, dated Feb. 6, 2023.

\* cited by examiner

UAV AND CONTROL METHOD THEREOF

TECHNICAL FIELD

The disclosure relates in general to a UAV and a UAV control method.

BACKGROUND

Unmanned aerial vehicle (UAV) or unmanned aircraft system (UAS), also known as drone, refers to various aircrafts without a pilot.

UAV is normally controlled via remote control, guidance or auto-piloting. UAV can be used in various fields including scientific research, site exploration, military, recreation, agriculture, disaster relief, hence having rapid growth in global UAV market.

SUMMARY

According to one embodiment, a UAV including a first barometer and a processing unit is provided. The first barometer is configured to provide a first air pressure value. The processing unit is coupled to the first barometer for receiving the first air pressure value from the first barometer, performing timing-synchronization on the first air pressure value provided by the first barometer and an external reference air pressure value provided by an external reference barometer to obtain a timing-synchronized first air pressure value and recalculating the timing-synchronized first air pressure value to generate a compensated air pressure value, wherein the processing unit performs data fusion calculation on the first air pressure value, the compensated air pressure value and a sensor data to obtain a target fused data and real-timely controls an altitude and a posture of the UAV according to the target fused data.

According to another embodiment, a UAV control method configured to control a UAV provided with a first barometer is provided. The UAV control method includes: receiving a first air pressure value from the first barometer; performing timing-synchronization on the first air pressure value provided by the first barometer and an external reference air pressure value provided by an external reference barometer to obtain a timing-synchronized first air pressure value and recalculating the timing-synchronized first air pressure value to generate a compensated air pressure value; performing data fusion calculation on the first air pressure value, the compensated air pressure value and a sensor data to obtain a target fused data; and real-timely controlling an altitude and a posture of the UAV according to the target fused data.

The above and other aspects of the invention will become better understood with regard to the following detailed description of the preferred but non-limiting embodiment(s). The following description is made with reference to the accompanying drawings.

Figure 1:
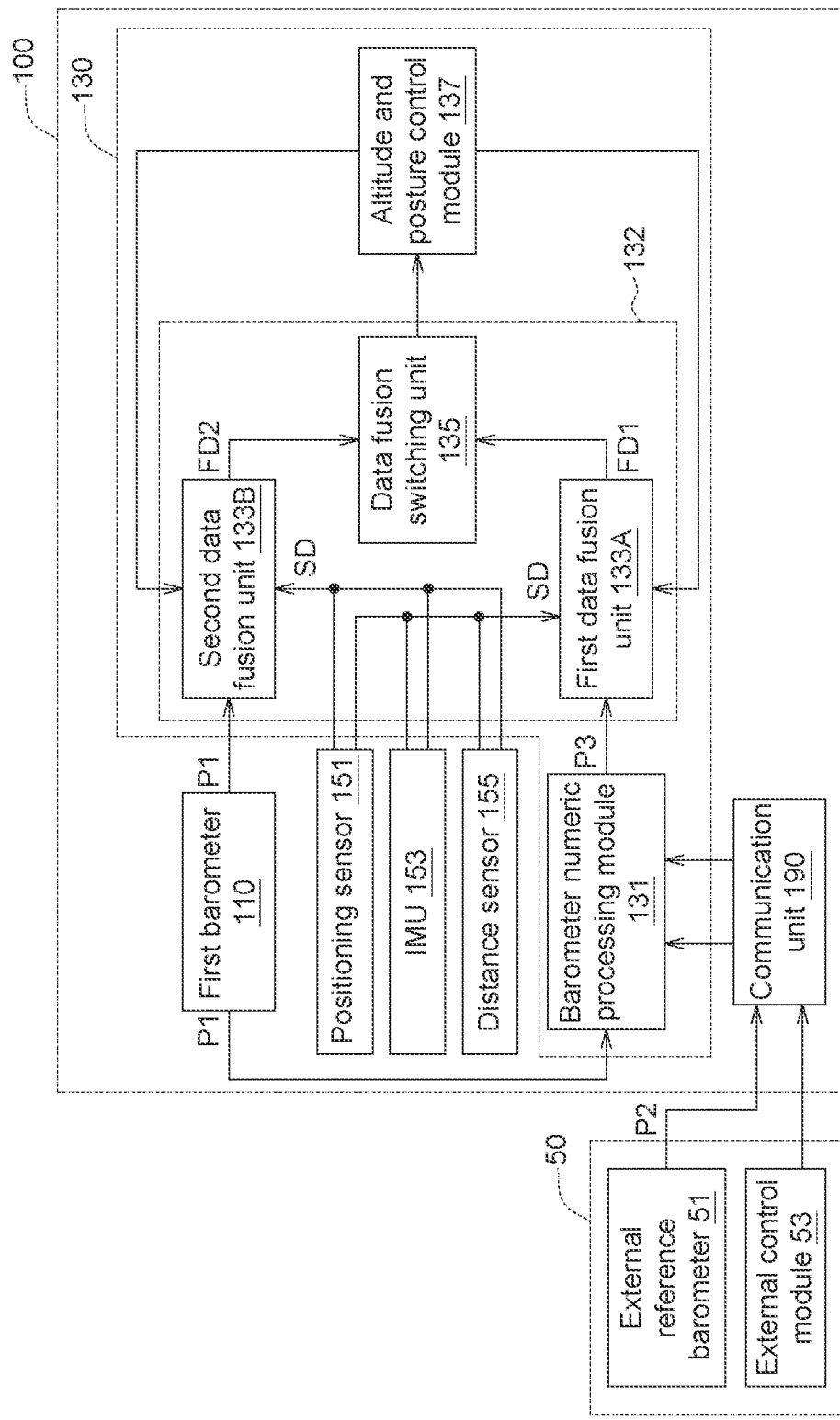
FIG. 1 is a functional block diagram of a UAV according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Technical terms are used in the specification with reference to the prior art used in the technology field. For any terms described or defined in the specification, the descriptions and definitions in the specification shall prevail. Each embodiment of the present disclosure has one or more technical features. Given that each embodiment is implementable, a person ordinarily skilled in the art can selectively implement or combine some or all of the technical features of any embodiment of the present disclosure.

Unmanned aerial vehicle (UAV) calculates the current altitude according to the air pressure value of a barometer on the aircraft and the global positioning system (GPS). When the UAV is flying under the bridge to perform detection, GPS signals could be blocked by the bridge. Meanwhile, if the wind blows, the wind will make the air pressure value change. The above situations (GPS signal is blocked by the bridge and the wind makes the air pressure value change) may make it difficult for the UAV to maintain the flight altitude and may cause flight difficulty and danger.

Embodiments of the present disclosure provide a UAV and a control method thereof capable of controlling the flight altitude and posture of UAV, not only saving hardware cost but also satisfactorily controlling the cost of software development.

FIG. 1 is a functional block diagram of a UAV according to an embodiment of the present disclosure. As indicated in FIG. 1, the UAV 100 according to an embodiment of the present disclosure includes a first barometer 110, a processing unit 130, a positioning sensor 151, an inertial measurement unit (IMU) 153, a distance sensor 155 and a communication unit 190. The UAV 100 further performs wireless communication with an external auxiliary device 50. The external auxiliary device 50 includes at least one external reference barometer 51 and an external control module 53.

The first barometer 110 is configured to provide a first air pressure value P1 to the processing unit 130. The first barometer 110 may be on the UAV 100 or built-in in the UAV, and therefore can also be referred as UAV barometer hereinafter.

The processing unit 130 is coupled to the first barometer 110. The processing unit 130 receives a first air pressure value P1 from the first barometer 110 and performs timing-synchronization on the first air pressure value P1 received from the first barometer 110 and an external reference air pressure value P2 provided by the external reference barometer 51 to obtain a timing-synchronized first air pressure value P1 and recalculates the timing-synchronized first air pressure value P1 to generate a compensated air pressure value P3. The processing unit 130 performs data fusion calculation on the compensated air pressure value P3 and a sensor data SD to obtain a target fused data. The processing unit 130 real-timely controls the altitude and posture of the UAV 100 according to the target fused data.

In an embodiment, the processing unit 130 includes a barometer numeric processing module 131, a first data fusion unit 133A, a second data fusion unit 133B, a data fusion switching unit 135 and an altitude and posture control module 137. Example of the processing unit 130 includes but is not limited to general purpose central processing unit (CPU), application specific integrated circuit (ASIC), microcontroller, microprocessor, processor, digital signal processor (DSP), digital logic circuit, field programmable gate array (FPGA) and/or hardware element or circuit with calculation function. The first data fusion unit 133A, the second data fusion unit 133B, and the data fusion switching unit 135 together can be referred as the data fusion module 132.

The barometer numeric processing module 131 performs timing-synchronization on the first air pressure value P1 received from the first barometer 110 and the external reference air pressure value P2 provided by the external reference barometer 51 and recalculates the timing-synchronized first air pressure value P1 to generate the compensated air pressure value P3.

The data fusion module 132 performs data fusion calculation on the first air pressure value P1, the compensated air pressure value P3 and a sensor data SD to obtain the target fused data.

The first data fusion unit 133A receives the compensated air pressure value P3 and the sensor data SD and performs data fusion calculation thereon to obtain the first fusion data FD1.

The second data fusion unit 133B receives the first air pressure value P1 of the first barometer 110 and the sensor data SD and performs data fusion calculation thereon to obtain the second fusion data FD2. In an embodiment of the present disclosure, the second data fusion unit 133B can be a selection unit.

Exemplarily but not restrictively, the first data fusion unit 133A and the second data fusion unit 133B can use an extended Kalman filter (EKF) for the purpose of data fusion (DF). The extended Kalman filter estimates the real-time position, speed and angular direction of the UAV according to the information provided by inertial measurement unit (such as gyroscope, accelerometer or electronic compass), GPS, barometer and airspeed.

The data fusion switching unit 135 is configured to switch or select the first fusion data FD1 or the second fusion data FD2 to obtain the target fused data and further transmit the target fused data to the altitude and posture control module 137. In an embodiment of the present disclosure, the data fusion switching unit 135 can be realized by a selection unit.

The altitude and posture control module 137 controls the altitude and/or posture of the UAV 100 according to the target fused data selected by the data fusion switching unit 135. Moreover, the altitude and posture control module 137 can further feedback-control the first data fusion unit 133A and the second data fusion unit 133B of the data fusion module 132.

The positioning sensor 151 provides localization information including but not limited to satellite localization information and/or ultra-wideband localization information.

The inertial measurement unit 153 provides an inertial measurement data. Example of the inertial measurement unit 153 includes but is not limited to gravity sensor, electronic gyroscope, and electronic compass.

The distance sensor 155 provides a distance sensing data. Example of the distance sensor 155 includes but is not limited to light detection and ranging (Lidar), ultrasonic sensor, and time-of-flight (ToF) sensor.

The sensor group is composed of any combination of the following elements: the positioning sensor 151, the inertial measurement unit 153 and the distance sensor 155. The data transmitted to the processing unit 130 from the sensor group can also be referred as sensor data SD.

The external reference barometer 51 provides the external reference air pressure value P2 to the communication unit 190, which then transmits the external reference air pressure value P2 to the processing unit 130. If the external auxiliary device 50 includes multiple external reference barometers 51, the external auxiliary device 50 can transmit multiple external reference air pressure values P2 to the processing unit 130. In another embodiment, the external reference air pressure value P2 can be an average of the air pressure values of the external reference barometers 51.

The external control module 53 is configured to determine whether the external auxiliary device 50 is fixed or is in a stable state (stable state, e.g. the external auxiliary device 50 does not move largely). When the external control module 53 determines that the external auxiliary device 50 is fixed or is in a stable state, the external control module 53 outputs a notification signal to the communication unit 190 of the UAV 100. The communication unit 190 transmits the notification signal outputted by the external control module 53 to the processing unit 130, such that the processing unit 130 can control the posture and altitude of the UAV 100 with reference to the external reference air pressure value P2 provided by the external reference barometer 51.

Figure 2:
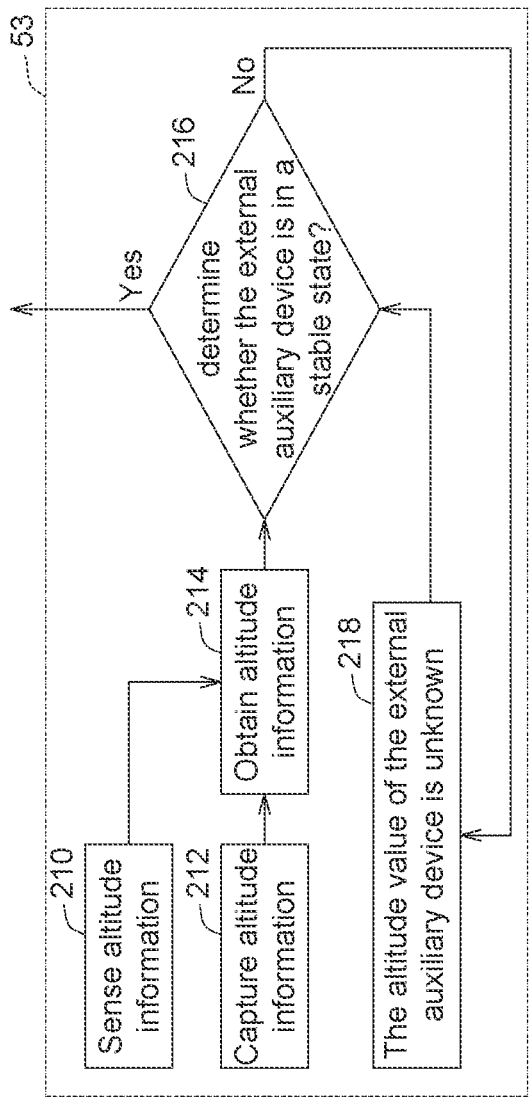
FIG. 2 is a control diagram of an external control module according to an embodiment of the present disclosure.

FIG. 2 is a control diagram of an external control module 53 according to an embodiment of the present disclosure. As indicated in FIG. 2, the external control module 53 can obtain an altitude value of the external auxiliary device 50 (such as the altitude above ground, the altitude above sea level or the altitude of the external auxiliary device 50 relative to an object whose altitude is known). The external control module 53 can be set to a full actuation state or a partial actuation state. In the full actuation state, the environmental information provided by the external control module 53 is accurate and close to the reality and can be used in subsequent calculation to provide a thorough mutual correction for correcting the barometer sensing values provided by the barometers of different makes. In the partial actuation state, the UAV 100 according to an embodiment of the present disclosure can be quickly deployed.

In the altitude information sensing step 210, altitude information can be sensed and obtained by an ultrasound device or an optical device, such as Lidar, infrared light, visible light, or ToF camera.

In the altitude information capturing step 212, the altitude information is manually set or is provided by an external device.

In the altitude information obtaining step 214, the altitude information provided in the altitude information sensing step 210 or the altitude information capturing step 212 can be used.

In the determination step 216, whether the external auxiliary device 50 is fixed or in a stable state is determined according to the obtained altitude information. For example, if altitude change information within a period of time (or between several measurements) is smaller than a specific value, the external auxiliary device 50 is determined as fixed or in a stable state. If the determination in step 216 is positive, this indicates that the external auxiliary device 50 does not have a large span of movement, and the external control module 53 outputs a notification signal to the UAV 100; and, the external reference air pressure value P2 of the external reference barometer 51 arranged on the external auxiliary device 50 can be provided for the reference of the processing unit 130 of the UAV 100.

If the determination in step 216 is negative, the method proceeds to step 218. In the step 218, it is determined that the altitude value of the external auxiliary device 50 could be unknown (the external auxiliary device 50 could be at a fixed state or stable state and will not have a large span of movement, such as the UAV hovering state).

In an embodiment of the present disclosure, when the altitude information of the external auxiliary device 50 is known, the external auxiliary device 50 can assist the UAV 100 in setting the target flight altitude and adjusting relative altitude of the current flight altitude. When the altitude information of the external auxiliary device 50 is unknown, the external auxiliary device 50 can assist the UAV 100 in adjusting relative altitude of the current flight altitude. The correspondence between altitude and air pressure can be obtained with reference to relevant information of local meteorological research.

Figure 3:
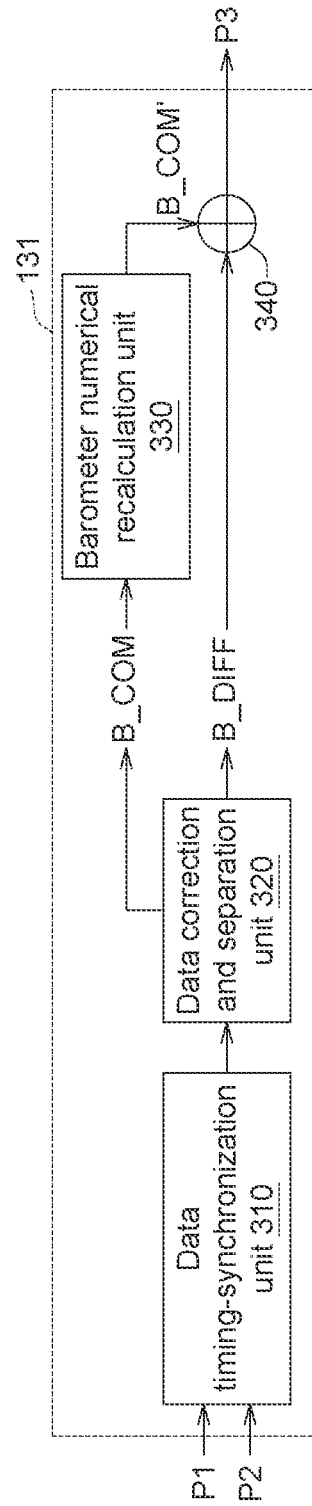
FIG. 3 is a functional block diagram of a barometer numeric processing module according to an embodiment of the present disclosure.

FIG. 3 is a functional block diagram of a barometer numeric processing module 131 according to an embodiment of the present disclosure. As indicated in FIG. 3, the barometer numeric processing module 131 includes a data timing-synchronization unit 310, a data correction and separation unit 320, a barometer numerical recalculation unit 330 and an operation unit 340.

In an embodiment of the present disclosure, the first barometer 110 provides the first air pressure value P1 and a relevant first time mark. Similarly, the external reference barometer 51 provides the external reference air pressure value P2 and a relevant second time mark. The first time mark and second time mark can adopt real world time (but it is not necessary) or any synchronous information that can assist with the marking of the air pressure values.

The data timing-synchronization unit 310 synchronously arranges the first air pressure value P1 and the external reference air pressure value P2 to obtain a timing-synchronized first air pressure value P1 according to the time marks. In an embodiment of the present disclosure, when the time values of the first time mark and the second time mark are identical or have a difference smaller than an error, the corresponding first air pressure value P1 and the external reference air pressure value P2 are determined as air pressure values of the same time point.

In an initial state, the data correction and separation unit 320 corrects the mutual deviation between the synchronously arranged first air pressure value P1 and the external reference air pressure value P2, so that the information and air pressure values provided by the first barometer 110 and the external reference barometer 51 later can have consistent interpretation. In an embodiment, the correction includes but is not limited to measuring the first air pressure value P1 and the external reference air pressure value P2 at each altitude to obtain the mutual deviation between the synchronously arranged first air pressure value P1 and the external reference air pressure value P2 at each altitude, so that the error can be eliminated during operation. In an operating state, the data correction and separation unit 320 outputs the common mode pressure value B_COM and differential pressure value B_DIFF of the corrected target barometer (that is, the first barometer 110).

In an embodiment of the present disclosure, the external reference barometer 51 is corrected. For example, the external reference barometer 51 is corrected to match the value of the first barometer 110, so that the output value of the corrected external reference barometer 51 can have consistent (similar or identical) interpretation with the first barometer 110 regarding environmental height and height-varying change. That is, even if the barometer (such as the external reference air pressure value P2) already has measurement error when leaving the factory, in an embodiment of the present disclosure, correction still can be performed such that the air pressure value measured by each barometer at the vicinity can have consistent interpretation. Although in the present embodiment, correction is exemplified on the external reference barometer 51, and the present disclosure is not limited thereto. In another embodiment, correction may be performed on the first barometer 110 or both the first barometer 110 and the external reference barometer 51.

After the first air pressure value P1 and the external reference air pressure value P2 both are timing-synchronized and corrected, the first air pressure value P1 and the external reference air pressure value P2 will have consistent similar or identical interpretation regarding the air pressure value in the space and height-varying change in air pressure. Exemplarily but not restrictively, at the same height, the first air pressure value P1 and the external reference air pressure value P2 are identical.

Given that relative height between the first barometer 110 and the external reference barometer 51 is known, before calculating the common mode air pressure value B_COM, the data correction and separation unit 320 further performs "mapping" for mapping the external reference air pressure value P2, so that the external reference air pressure value P2 can be adjusted to air pressure value at the same height with the first air pressure value P1 to obtain a mapped external reference air pressure value P2remap. The mapped external reference air pressure value P2remap is an air pressure value whose height is identical to that of the first air pressure value P1. For example, if the height of the UAV 100 is H2 (the height of the external auxiliary device 50)+h (relative height between the UAV 100 and the external auxiliary device 50), the mapped external reference air pressure value P2remap is the due air pressure value of the external reference barometer 51 at the height of "H2+h". Through mapping, the common mode air pressure value B_COM can be expressed as formula (1-1) below:

$$B\_COM = (P1 + P2\text{remap})/2 \quad (1\text{-}1)$$

Besides, the differential pressure value B_DIFF can be expressed as formula (1-2):

$$B\_DIFF = P1 - B\_COM \quad (1\text{-}2)$$

In an embodiment, the air pressure value recalculation unit 330 eliminates or reduces the wind-caused air pressure value change. For example, when there is no wind, the first air pressure value of the first barometer 110 is P1_0, and the corrected air pressure value of the external reference barometer 51 is P2_cal. In an embodiment, the first barometer 110 and the external reference barometer 51 are close to each other. When there is wind, both the first barometer 110 and the external reference barometer 51 are influenced by wind and will have identical or similar wind-caused change in air pressure value. If the wind-caused air pressure value change is P_wind, then the first air pressure value P1 of the first barometer 110 can be expressed as: P1=P1_0+P_wind, the external reference air pressure value P2 of the external reference barometer 51 can be expressed as: P2=P2_cal+P_wind. P_wind can be obtained by deducting P2_cal from P2. In another embodiment, the wind-caused air pressure value change P_wind can be obtained by using uncorrected values. For example, when there is no wind, the corrected air pressure value of the external reference barometer 51 is P2_0, the external reference air pressure value P2 of the external reference barometer 51 influenced by wind can be expressed as: P2=P2_0+P_wind, and P_wind can be obtained by deducting P2_0 from P2. P_wind can also be obtained by applying identical or similar calculation on P1. The air pressure value recalculation unit 330 can deduct the wind-caused air pressure value change P_wind from B_COM. The calculation is expressed as formula (2):

$$B\_COM'=B\_COM-P\_wind \qquad (2)$$

After the wind-caused air pressure value change is deducted, the air pressure value of the first barometer 110 is adjusted as the compensated air pressure value P3. The calculation is expressed as formula (3):

$$P3=B\_COM'+B\_DIFF \qquad (3)$$

In an embodiment of the present disclosure, when relative height between the first barometer 110 and the external reference barometer 51 is unknown, mapping is not performed. In formula (1-1), P2_remap can be substituted by the corrected air pressure value P2_cal, and other calculations are identical or similar to above disclosure. In another embodiment, when relative height between the first barometer 110 and the external reference barometer 51 is known, mapping can be omitted, the P2_remap of formula (1-1) can be substituted by the corrected air pressure value P2_cal.

An example of "mapping" performed by the data correction and separation unit 320 will be illustrated below, but the present discourse is not limited thereto. For example, at the same environment and altitude, the air pressure value of the first air pressure value P1 is 980 Pascal (Pa), and the barometer reading of the external reference air pressure value P2 is 965 Pascal. When the height of the two barometers is changed to the same or similar, the first air pressure value P1 and the external reference air pressure value P2 will have identical or similar amount of change in air pressure value. Therefore, the data correction and separation unit 320 can firstly compensate the difference value between the readings of the two barometers (the difference value=980 Pa−965 Pa) to the external reference air pressure value P2 to correct the external reference air pressure value P2, and compensate the difference value between relative height of the first barometer 110 and the external reference barometer 51 (the difference value can be obtained through measurement in advance) to the measured values of the external reference air pressure value P to obtain the mapped external reference air pressure value P2remap. Or, the first air pressure value can be measured at each height of the UAV to create a mapped value table. Thus, when the UAV control mechanism of the present embodiment of the present disclosure is implemented, it is already known that there is existing difference in measurement between the first air pressure value P1 and the external reference air pressure value P2. When numeric processing is performed afterwards, this measurement difference can be compensated to correct the external reference air pressure value P2. Then, the mapped external reference air pressure value P2remap of the external reference barometer 51 at the height of the first barometer 110 can be obtained according to the mapped value table. Under such circumstance, the correspondence relationship of height vs. air pressure value of the barometer is already known, therefore the mapped data can be obtained.

In an embodiment, the height adjustment of the UAV 100 can be obtained according to formula (4) or other formulas of height vs. air pressure conversion, so that the height of the UAV can be adjusted by the altitude and posture control module 137.

$$Z2-Z1=18400(1+a*t)*\log(P1/P3) \qquad (4)$$

Wherein, Z2−Z1 represents the due relative height between the first barometer 110 and the UAV 100; a represents a constant (including but not limited to 1/273); t represents a Celsius temperature.

In another embodiment, the mapped value table can be obtained according to formula (4). For example, formula (4) is modified as formula (5):

$$ZX-Z1=18400(1+a*t)*\log(P1/PX) \qquad (5)$$

ZX represents a height of the first barometer 110; PX represents the air pressure value measured at the height of the first barometer 110. When relative height between the first barometer 110 and the external reference barometer 51 is known, the mapped external reference air pressure value P2 can be obtained affording to formula (5). Since the first air pressure value P1 and the external reference air pressure value P2 are already corrected, the first air pressure value P1 and the external reference air pressure value P2 are consistent regarding the air pressure and height change in the real world.

Or, if the relative altitude between the first barometer 110 and the external reference barometer 51 is unknown (that is, Z2−Z1 is unknown), when the altitudes of the first barometer 110 and the external reference barometer 51 are stable, the altitude difference between the altitude of the first barometer 110 and the altitude of the external reference barometer 51 can be calculated according to the air pressure values of the first barometer 110 and the external reference barometer 51. When there is no wind, respective air pressure values of the first barometer 110 and the external reference barometer 51 represent respective altitudes. When the wind blows, the first barometer 110 and the external reference barometer 51 are arranged at adjacent environments, so that the influence of wind on the first barometer 110 and the influence of wind on the external reference barometer 51 can be close to each other as much as possible.

Moreover, if the external reference barometer 51 includes several reference barometers, the above mapping step can be applied on the air pressure value of each reference barometer.

In an embodiment of the present disclosure, the elimination of the influence of wind is disclosed below, but the present disclosure is not limited thereto. Barometer is used to measure air pressure, and when the barometer leaves the factory, the output of barometer is a voltage value, which varies with air pressure. The manufacturing factory will provide a correspondence table of voltage vs. air pressure. Next, regarding the air pressure vs. altitude relationship, some research in the field of meteorology are already done (the above formula (3) is one of the research results). Currently, the average air pressure above sea level is 1013.25 hectopascal (hPa). Since the air pressure drops as the altitude increases, the correspondence table of voltage vs. air pressure can be created.

Additionally, if the UAV 100 has extraordinary altitude changes, the extra change in air pressure caused by altitude change can be represented by parameter B_DIFF, then the UAV 100 can offset the parameter B_DIFF through altitude adjustment.

In one embodiment, the barometer numerical recalculation unit 330 can be realized by a relevant meteorological model such as Norwegian cyclone model.

Example of the operation unit 340 includes but is not limited to adder. The operation unit 340 performs an operation (such as addition) on B_COM' and the differential pressure value B_DIFF to obtain the compensated air pressure value P3.

Figure 4:
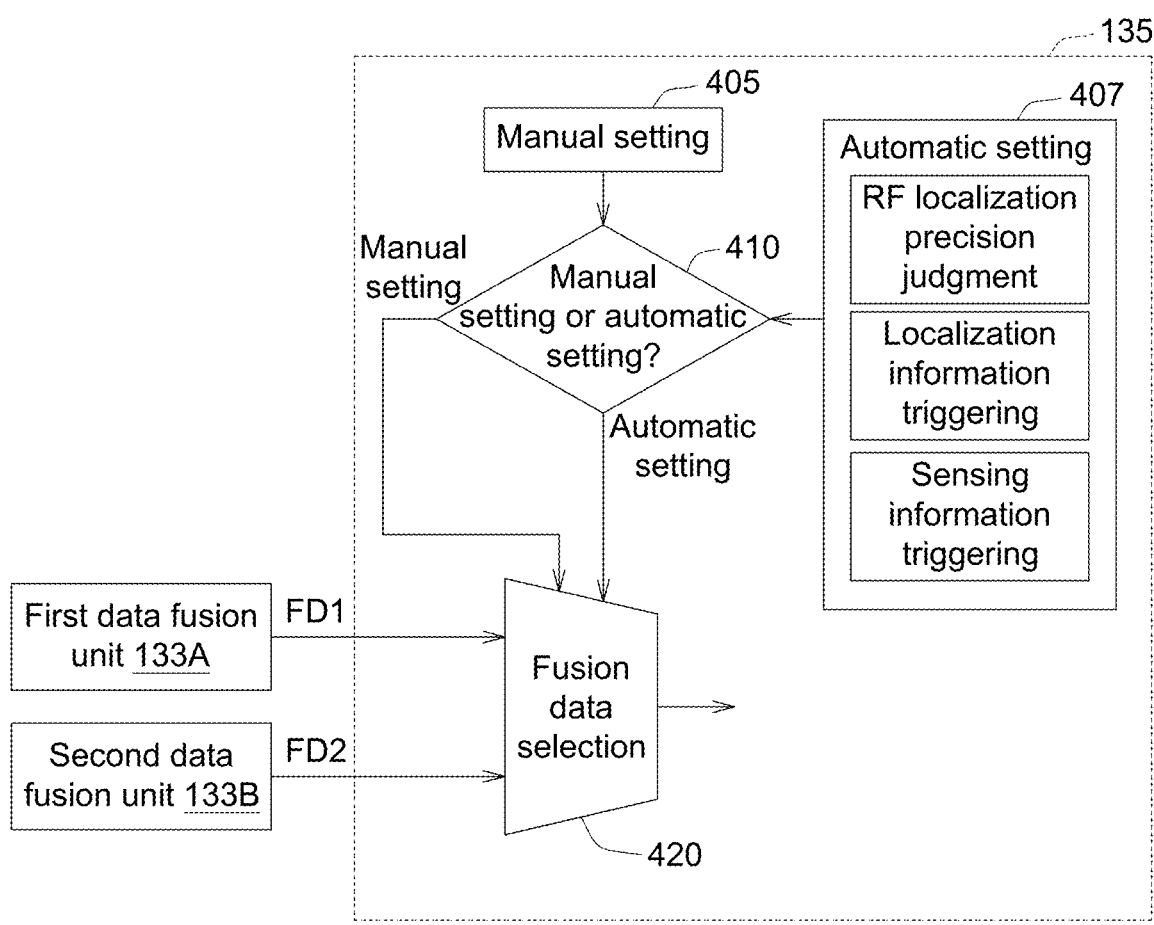
FIG. 4 is an operation diagram of a data fusion switching unit according to an embodiment of the present disclosure.

FIG. 4 is an operation diagram of a data fusion switching unit 135 according to an embodiment of the present disclosure. The data fusion switching unit 135 is configured to switch and select the first fusion data FD1 and the second fusion data FD2, and transmit the selected target fused data to the altitude and posture control module 137.

In step 405, manual setting is performed on the data fusion switching unit 135, so that the user can manually select the first fusion data FD1 or the second fusion data FD2.

In step 407, automatic setting is performed on the data fusion switching unit 135. Manual setting (automatic switching setting) can set at least one switching condition, which includes any combinations of the following conditions (the present disclosure is not limited thereto):

Radio frequency (RF) localization precision judgment: whether data fusion switching is performed or not is determined according to RF localization precision, such as satellite localization, ultra-wideband localization, or other RF localization. Let satellite localization be taken for example. When satellite localization fails or localization precision is lower than a setting value, one of the first fusion data FD1 and the second fusion data FD2 is selected; when satellite localization precision is higher than the setting value, the other one of the first fusion data FD1 and the second fusion data FD2 is selected. For example, when the satellite localization precision of the satellite localization information provided by the positioning sensor 151 is lower than the setting value, the first fusion data FD2 is selected; when the satellite localization precision is higher than the setting value, the second fusion data FD1 is selected.

Localization information triggering: switch triggering is based on localization information. For example, when the UAV 100 is located at a first location area, one of the first fusion data FD1 and the second fusion data FD2 is selected; when the UAV 100 is located at a second location area or is outside the first location area, the other one of the first fusion data FD1 and the second fusion data FD2 is selected.

Sensing information triggering: switch triggering is based on the sensor value. When the sensing value of a distance sensor or an illumination sensor falls within a first range, one of the first fusion data FD1 and the second fusion data FD2 is selected; when the sensing value of the distance sensor or the illumination sensor value falls within a second range or is outside the first range, the other one of the first fusion data FD1 and the second fusion data FD2 is selected.

In step 410, whether the current state is manual setting or automatic setting is determined. In an embodiment, the current state is pre-determined as automatic setting, but can be set as manual setting or automatic setting according to the user's judgment.

In step 420, one of the first fusion data FD1 and the second fusion data FD2 is used as a target fused data according to whether the current state is manual setting or automatic setting.

Figure 5A:
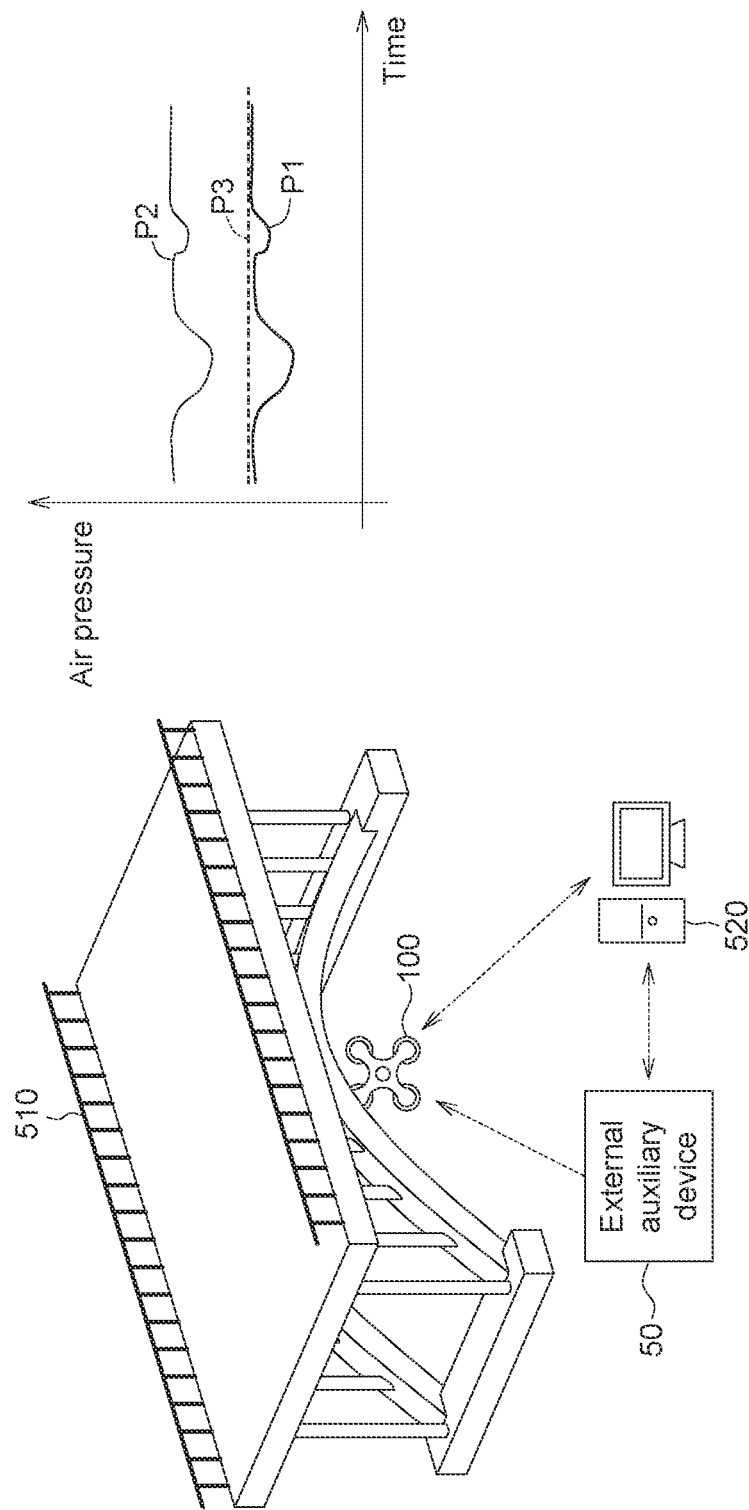
FIG. 5A and FIG. 5B are two operation examples according to an embodiment of the present disclosure.
Figure 5B:
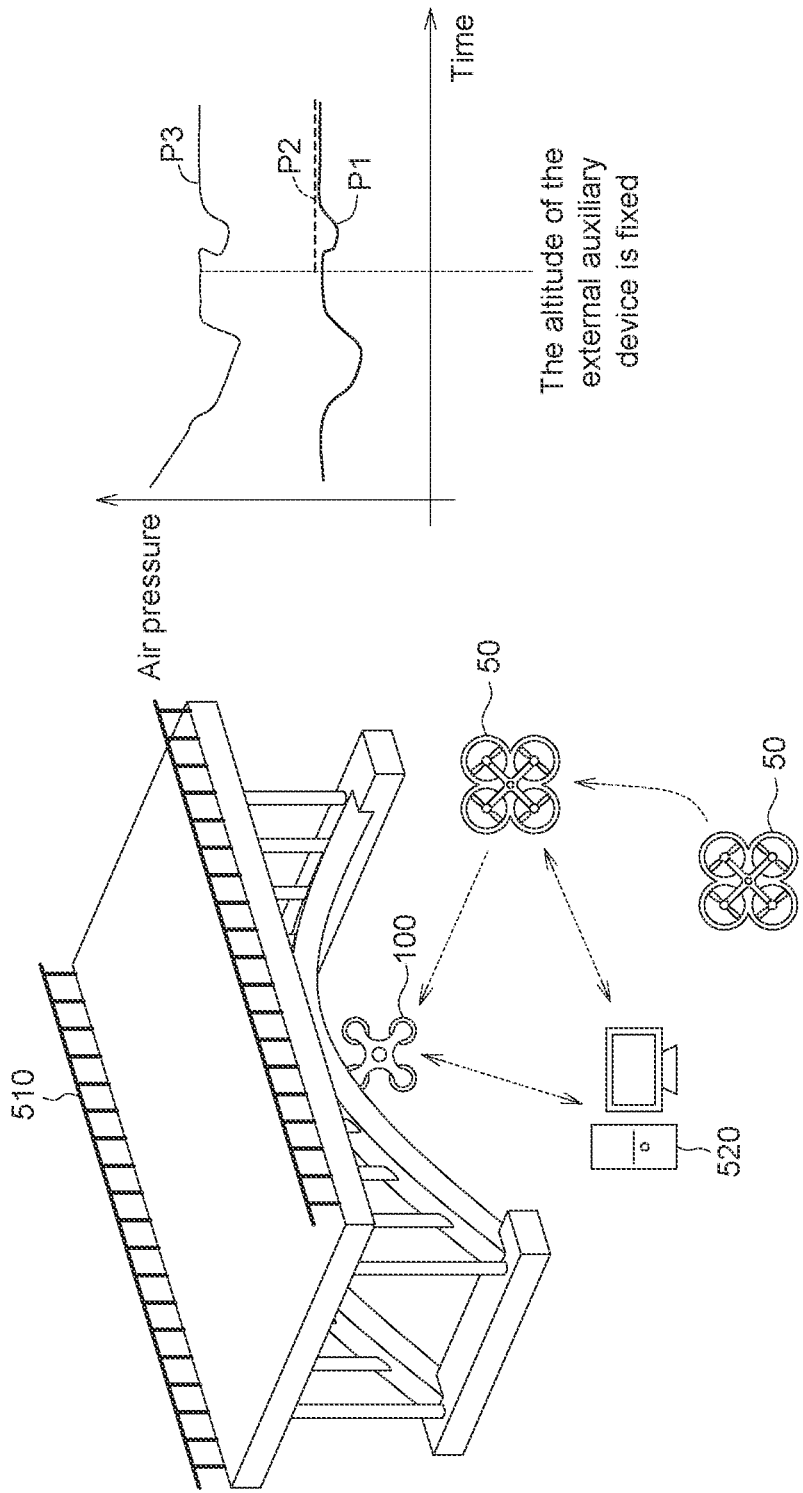

FIG. 5A and FIG. 5B are two operation examples according to an embodiment of the present disclosure. The first operation example of FIG. 5A can be used when the relative altitude difference between the external reference barometer 51 and the UAV 100 is known. The second operation example of FIG. 5B can be used when the relative altitude difference between the external reference barometer 51 and the UAV 100 is unknown.

FIG. 5A illustrates a scenario when the UAV 100 is used in under bridge inspection according to an embodiment of the present disclosure. The UAV 100 (equipped or built-in with a first barometer 110) slowly moves from the outside to the underneath of a bridge 510 at a constant altitude. The UAV ground control center 520 can control the UAV 100 and/or the external auxiliary device 50.

Since the first barometer 110 of the UAV 100 and the external reference barometer 51 of the external auxiliary device 50 are in identical or similar environments, the first barometer 110 and the external reference barometer 51 will sense similar changes in air pressure. Given that the relative altitude between the first barometer 110 and the external reference barometer 51 is known, the UAV 100 can therefore obtain the change in the air pressure value P1 caused by wind according to the comparison between the air pressure value P1 of the first barometer 110 and the air pressure value and P2 of the external reference barometer 51 and perform recalculation to generate a compensated air pressure value P3. Thus, the UAV will be less likely to make unnecessary altitude adjustments in response to the change in time-varying air pressure (wind) or generate flight danger (for example, the UAV may hit the bridge when ascending).

In FIG. 5A, the UAV 100 uses its own GPS module time, the external reference barometer 51 is connected to the control center time of the control center 520, and timing-synchronization is performed. When barometer is corrected, the mapped external reference air pressure value P2remap is recalculated, the control center 520 transmits a "known relative altitude difference between the external reference barometer 51 and the UAV 100" to the UAV 100.

In FIG. 5B, the external auxiliary device 50 is another UAV, which can be realized by a conventional UAV provided with a satellite localization module, can implement excellent outdoor hovering. After the external auxiliary device 50 takes off and ascends to a suitable position, the external auxiliary device 50 can perform hovering. Meanwhile, according to the relative altitude relationship between the UAV 100 and the external auxiliary device 50, the UAV 100 can calculate corresponding air pressure compensation with reference to the air pressure value of the external reference barometer 51 of the external auxiliary device 50, so that the UAV 100 can maintain a stable physical altitude and reduce or eliminate unnecessary altitude adjustments in response to the change in time-varying air pressure (wind).

In FIG. 5B, the UAV 100 uses its own GPS module time, the external reference barometer 51 is connected to the control center time of the control center 520, and timing-synchronization is performed. When barometer is corrected, the mapped external reference air pressure value P2remap is recalculated, the UAV 100 controls the altitude and posture with reference to the external reference air pressure value P2 of the external reference barometer 51.

Figure 6:
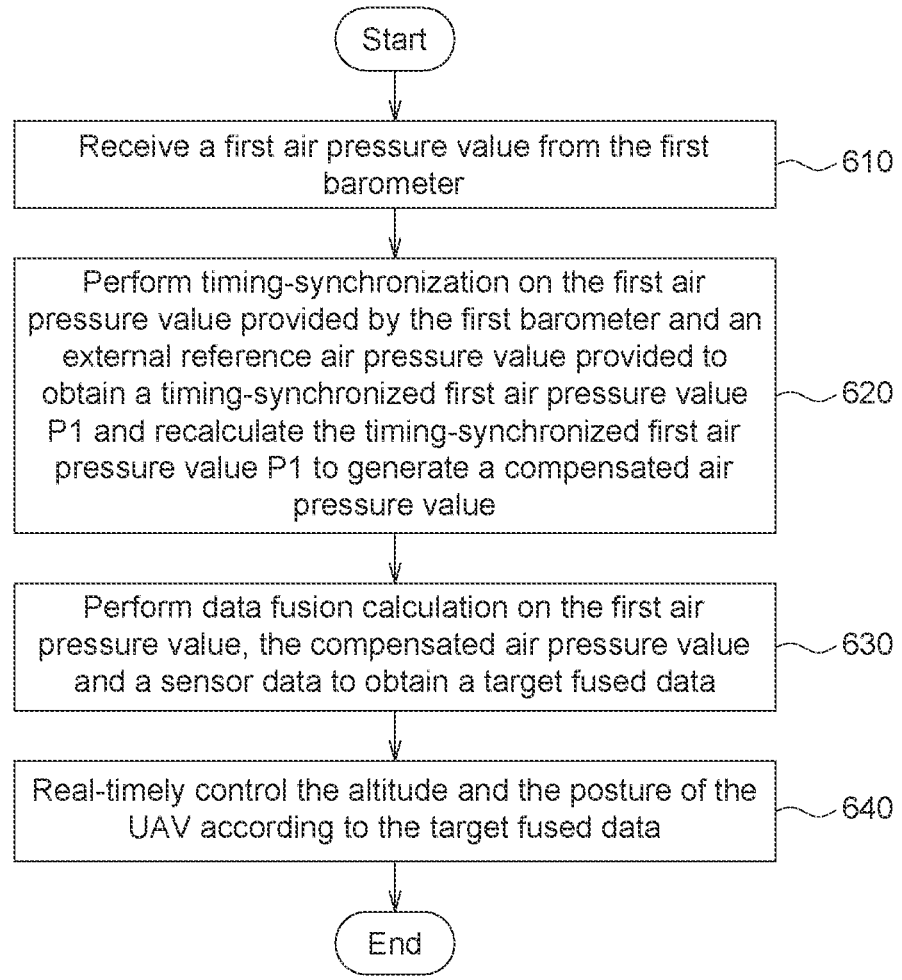
FIG. 6 is a flowchart of a UAV control method according to an embodiment of the present disclosure.

FIG. 6 is a flowchart of a UAV control method according to an embodiment of the present disclosure. In step 610, a first air pressure value is received from the first barometer. In step 620, timing-synchronization is performed on the first air pressure value provided by the first barometer and an external reference air pressure value provided by an external reference barometer to obtain a timing-synchronized first air pressure value P1 and the timing-synchronized first air pressure value P1 is recalculated to generate a compensated air pressure value. In step 630, data fusion calculation is performed on the first air pressure value, the compensated air pressure value and a sensor data to obtain a target fused data. In step 640, the altitude and posture of the UAV is real-timely controlled according to the target fused data.

Embodiments of the present invention relate to a UAV and a control method thereof capable of assisting the UAV with the calculation of real-time altitude. The UAV still can maintain a stable flight altitude in a time-varying wind environment with reference to the reference air pressure value of the external reference barometer. Thus, the feasibility and safety of UAV in bridge detection can be increased.

Embodiments of the present invention relate to a UAV and a control method thereof used in an environment lacking satellite localization, such as under bridge UAV inspection, to reduce or eliminate the influence of time-varying air pressure (wind) and avoid the UAV making erroneous real-time flight altitude, erroneous altitude adjustment or dangerous flight.

Embodiments of the present invention provide a low cost UAV and a control method thereof capable of resolving the problems of satellite signals being too poor or being blocked during bridge detection and the UAV over-adjusting flight altitude due to time-varying air pressure (wind).

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A UAV (unmanned aerial vehicle), comprising:
a first barometer configured to provide a first air pressure value;
a processing unit coupled to the first barometer for receiving the first air pressure value from the first barometer, performing timing-synchronization on the first air pressure value provided by the first barometer and an external reference air pressure value provided by an external reference barometer to obtain a timing-synchronized first air pressure value and recalculating the timing-synchronized first air pressure value to generate a compensated air pressure value, wherein the processing unit performs data fusion calculation on the first air pressure value, the compensated air pressure value and a sensor data to obtain a target fused data and real-timely controls an altitude and a posture of the UAV according to the target fused data.

2. The UAV according to claim 1, wherein, the processing unit comprises:
a barometer numeric processing module configured to timing-synchronize the first air pressure value provided by the first barometer and the external reference air pressure value provided by the external reference barometer and recalculate the timing-synchronized first air pressure value to generate the compensated air pressure value;
a data fusion module configured to receive the first air pressure value, the compensated air pressure value and the sensor data and perform data fusion calculation to obtain the target fused data; and
an altitude and posture control module configured to control the altitude and the posture of the UAV using the target fused data and further feedback-control the data fusion module.

3. The UAV according to claim 2, wherein, the data fusion module comprises:

a first data fusion unit configured to receive the compensated air pressure value and the sensor data and perform data fusion calculation to obtain a first fusion data; and
a second data fusion unit configured to receive the first air pressure value provided by the first barometer and the sensor data and perform data fusion calculation to obtain a second fusion data; and
a data fusion switching unit configured to switch or select the first fusion data or the second fusion data to obtain the target fused data and transmit the target fused data to the altitude and posture control module,
wherein, the altitude and posture control module controls the altitude and the posture of the UAV according to the target fused data and further feedback-controls the first data fusion unit and the second data fusion unit of the data fusion module.

4. The UAV according to claim 3, wherein, the barometer numeric processing module comprises:
a data timing-synchronization unit configured to synchronously arrange the first air pressure value and the external reference air pressure value according to a plurality of time marks;
a data correction and separation unit configured to output a common mode pressure value and a differential pressure value in an operating state;
a barometer numerical recalculation unit configured to generate a recalculated first air pressure value according to the common mode pressure value; and
an operation unit configured to obtain the compensated air pressure value according to the recalculated first air pressure value and the differential pressure value.

5. The UAV according to claim 4, wherein, in an initial state, the data correction and separation unit corrects a mutual deviation between the synchronously arranged first air pressure value and the external reference air pressure value.

6. The UAV according to claim 5, wherein, in automatic setting, at least one switching condition set by the data fusion switching unit comprises any combinations of the following conditions:
a radio frequency (RF) localization precision judgment for selecting the first fusion data or the second fusion data according to an RF localization precision;
a localization information triggering for selecting the first fusion data or the second fusion data according to a localization information; and
a sensing information triggering for selecting the first fusion data or the second fusion data according to a sensing value of a distance sensor or an illumination sensor.

7. The UAV according to claim 4, wherein,
before calculating the common mode pressure value, the data correction and separation unit maps the external reference air pressure value as a mapped external reference air pressure value, the mapped external reference air pressure value having an altitude identical to an altitude of the first air pressure value.

8. An UAV (unmanned aerial vehicle) control method for controlling a UAV provided with a first barometer, the UAV control method comprising:
receiving a first air pressure value from the first barometer;
performing timing-synchronization on the first air pressure value provided by the first barometer and an external reference air pressure value provided by an external reference barometer to obtain a timing-synchronized first air pressure value and recalculating the timing-synchronized first air pressure value to generate a compensated air pressure value;

performing data fusion calculation on the first air pressure value, the compensated air pressure value and a sensor data to obtain a target fused data; and real-timely controlling an altitude and a posture of the UAV according to the target fused data.

9. The UAV control method according to claim 8, wherein, the step of obtaining the target fused data comprises:

performing data fusion calculation on the compensated air pressure value and the sensor data to obtain a first fusion data, performing data fusion calculation on the first air pressure value provided by the first barometer and the sensor data to obtain a second fusion data; and switching and selecting the first fusion data and the second fusion data to obtain the target fused data.

10. The UAV control method according to claim 9, wherein, the step of generating the compensated air pressure value comprises:

synchronously arranging the first air pressure value and the external reference air pressure value according to a plurality of time marks;

outputting a common mode pressure value and a differential pressure value in an operating state;

generating a recalculated first air pressure value according to the common mode pressure value; and obtaining the compensated air pressure value according to the recalculated first air pressure value and the differential pressure value.

11. The UAV control method according to claim 10, wherein, the step of generating the compensated air pressure value further comprises: in an initial state, correcting a mutual deviation between the synchronously arranged first air pressure value and the external reference air pressure value.

12. The UAV control method according to claim 11, wherein, in automatic setting, at least one switching condition comprises any combinations of the following conditions:

an RF localization precision judgment for selecting the first fusion data or the second fusion data according to an RF localization precision;

a localization information triggering for selecting the first fusion data or the second fusion data according to a localization information; and a sensing information triggering for selecting the first fusion data or the second fusion data according to a sensing value of a distance sensor or an illumination sensor.

13. The UAV control method according to claim 10, wherein, before calculating the common mode pressure value, the external reference air pressure value is mapped as a mapped external reference air pressure value having an altitude identical to an altitude of the first air pressure value.

14. The UAV control method according to claim 13, wherein, when a relative altitude difference between the external reference barometer and the UAV is known, the UAV obtains an air pressure value change caused by the first air pressure value through a comparison between the first air pressure value and the external reference air pressure value and recalculates the air pressure value change to generate the compensated air pressure value, during barometer correction, a control center transmits the known relative altitude difference between the external reference barometer and the UAV to the UAV.

15. The UAV control method, wherein according to claim 13, during air pressure compensation, when a relative altitude difference between the external reference barometer and the UAV is unknown, after an external auxiliary device provided with the external reference barometer ascends to a predetermined position, the external auxiliary device hovers so that a relative altitude relationship is maintained between the UAV and the external auxiliary device, and the UAV refers to the external reference air pressure value of the external reference barometer of the external auxiliary device to perform air pressure compensation.

* * * * *